United States Patent [19]

Kilström et al.

[11] Patent Number: 4,910,444

[45] Date of Patent: Mar. 20, 1990

[54] BRAKING ARRANGEMENT FOR A MOTOR-DRIVEN CABLE REEL

[75] Inventors: Lars G. Kilström, Täby; Joakim A. Svanberg, Johanneshov; Lars G. Tuvin, Knivsta, all of Sweden

[73] Assignee: Aktiebolaget Electrolux, Stockholm, Sweden

[21] Appl. No.: 205,227

[22] Filed: Jun. 9, 1988

[30] Foreign Application Priority Data

Jun. 12, 1987 [SE] Sweden ............................. 8702451

[51] Int. Cl.⁴ ............................................... H02P 3/12
[52] U.S. Cl. ..................................... 318/375; 254/222; 318/362
[58] Field of Search ................ 318/362, 363, 364, 365, 318/368, 372, 375; 242/204, 75.4, 75.44, 75.51; 212/86, 126, 131, 132, 217; 191/12, 2 A; 254/222, 267, 268, 269, 270, 273, 274, 275, 276, 339, 340, 356, 362

[56] References Cited

U.S. PATENT DOCUMENTS

| | | | |
|---|---|---|---|
| 2,250,985 | 7/1941 | Benson | 254/275 |
| 2,973,467 | 2/1961 | Choudhury et al. | 318/368 X |
| 3,278,160 | 10/1966 | Sallow | 254/362 |
| 3,341,758 | 9/1967 | Plumpe | 318/375 X |
| 4,095,151 | 6/1978 | Mourick | 318/375 X |
| 4,144,482 | 3/1979 | Schwab | 318/375 X |
| 4,195,255 | 3/1980 | Guttmann | 318/375 X |
| 4,200,052 | 4/1980 | Cunningham et al. | 254/274 X |
| 4,271,383 | 6/1981 | Endo | 318/375 |
| 4,556,199 | 12/1985 | Dansie et al. | 254/362 X |
| 4,751,440 | 6/1988 | Dang | 318/370 |

FOREIGN PATENT DOCUMENTS

| | | | |
|---|---|---|---|
| 53-35116 | 4/1978 | Japan | 318/375 |
| 55-26080 | 2/1980 | Japan | 318/375 |
| 0985910 | 1/1983 | U.S.S.R. | 318/375 |

*Primary Examiner*—Bentsu Ro
*Attorney, Agent, or Firm*—Pearne, Gordon, McCoy & Granger

[57] ABSTRACT

Arrangement for winding of an electric cable which arrangement comprises a rotatable drum from which the cable is arranged to be wound off manually, and an electric motor (M) arranged to be connected to a first circuit for driving the drum in the winding direction and arranged to be rotated by the drum during unwinding of the cable. A second circuit (M,1,3,4) comprises besides the motor (M) also a contact means (1) arranged to be closed when the motor (M) is inoperative. During unwinding of the cable from the drum the motor generates a braking moment which increases with the speed of rotation of the motor.

The second circuit preferably comprises a voltage dependent switch (3), preferably a Zener-diode, which is arranged to be closed when the voltage generated by the motor (M) during the unwinding exceeds a value corresponding to a predetermined speed of rotation of the drum and, as a consequence, of the motor.

2 Claims, 1 Drawing Sheet

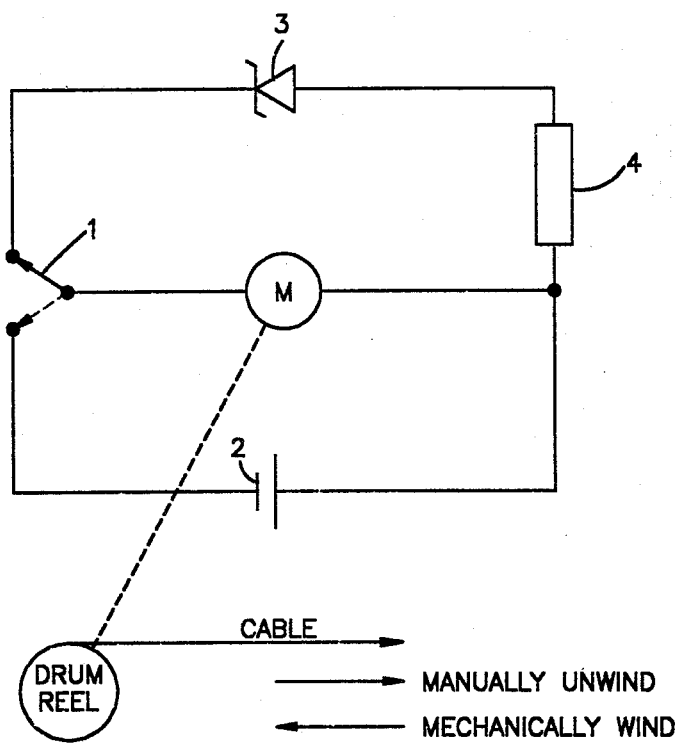

BRAKING ARRANGEMENT FOR A MOTOR-DRIVEN CABLE REEL

BACKGROUND OF THE INVENTION

The present invention relates to an arrangement for winding of an electric cable, comprising a rotatable drum, from which the cable is arranged to be wound off manually, and an electric motor arranged to be connected to a first circuit for driving the drum in the winding direction, and to be rotated by the drum during unwinding of the cable.

When an electric cable is drawn off a cable drum the movement takes place more or less intermittently. When the cable is exposed to heavy jerks, the drum must be braked in order to prevent the cable from being entangled. When the cable is pulled out gently, the drum should run easily.

The object of the present invention is to provide an arrangement by means of which the cable drum is slowed down when the cable is pulled out so that the cable will not be entangled.

SUMMARY OF THE INVENTION

The arrangement according to the invention is characterized by a second circuit which besides the motor also comprises a contact means arranged to be closed when the motor is inoperative, said motor generating a braking moment which increases with the speed of rotation during the unwinding of the cable from the drum.

According to a preferred embodiment of the invention the second circuit comprises a voltage dependent switch arranged to be closed when the voltage generated by the motor during the unwinding exceeds a value corresponding to a predetermined speed of rotation of the motor. In a preferred embodiment the voltage dependent switch comprises a Zener diode.

According to another preferred embodiment of the arrangement according to the invention a resistance to the second circuit for limiting the braking moment of the motor is connected.

BRIEF DESCRIPTION OF THE DRAWING

The invention is described in detail below with reference to the accompanying drawing FIGURE, which shows a circuit diagram of an embodiment of the arrangement according to the invention.

DETAILED DESCRIPTION OF THE PREFERRED EMBODIMENT

The drawing shows a motor M driving a rotatable drum for winding of an electric cable when the contact 1 takes the connecting position disclosed by the broken line. An example of a rotatable drum of the type under consideration is disclosed in co-pending U.S. application Ser. No. 182,893, filed on Apr. 18, 1988. This application is owned by the assignee of the present invention, and is incorporated by reference herein in its entirety. The motor receives its current from a current source 2. When the motor M is disconnected from the current source 2, the contact 1 takes the position shown by a continuous line. The motor M is in this case connected to a circuit comprising a Zener diode 3 and a resistance 4, in addition to the contact 1. When the cable is wound off the drum with the contact 1 in position shown in the drawing, the motor is rotated by the drum and operates as a generator producing a braking moment which increases with the speed of rotation.

The resistance 4 is connected in order to prevent a too heavy braking action of the motor M. The purpose of the Zener diode 3, which operates as a voltage dependent switch, is to close the circuit when the voltage generated by the motor during the unwinding exceeds a value corresponding to a predetermined speed of rotation of the drum, and, as a consequence, of the motor. In that way a braking action is avoided when the cable is wound off gently as the Zener diode does not let the current through until the voltage has reached a given value.

We claim:

1. In a device for winding an electric cable, said device including a rotatable drum, from which the cable is arranged to be wound off manually, and an electric motor arranged to be connected to a first circuit for driving the drum in the winding direction, the motor being rotated by the drum during unwinding of the cable, the improvement comprising a second circuit (M,1,3,4) which besides the motor (M) also includes a contact means (1) arranged to be closed when the motor (M) is inoperative, said motor generating a braking moment which increases with the speed of rotation during the unwinding of the cable from the drum, said second circuit further including a voltage dependent switch (3) arranged to be closed when the voltage generated by the motor during the unwinding exceeds a value corresponding to a predetermined speed of rotation of the motor, said second circuit still further including a resistance (4) for limiting the braking moment of the motor.

2. The device according to claim 1, wherein the voltage dependent switch is a Zener diode (3).

* * * * *